United States Patent
Zhang et al.

(10) Patent No.: US 9,599,834 B2
(45) Date of Patent: Mar. 21, 2017

(54) DEPOLARIZERS AND METHODS OF MAKING THEREOF

(71) Applicant: Thorlabs, Inc., Newton, NJ (US)

(72) Inventors: Lichao Zhang, Shanghai (CN); Sam Rubin, Shanghai (CN); Cary Zhang, Shanghai (CN)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 14/852,392

(22) Filed: Sep. 11, 2015

(65) Prior Publication Data

US 2016/0077352 A1   Mar. 17, 2016

Related U.S. Application Data

(60) Provisional application No. 62/049,789, filed on Sep. 12, 2014.

(51) Int. Cl.
| | |
|---|---|
| G02B 27/28 | (2006.01) |
| B05D 3/00 | (2006.01) |
| B05D 3/06 | (2006.01) |
| G02B 5/30 | (2006.01) |
| B05D 5/06 | (2006.01) |

(52) U.S. Cl.
CPC ......... *G02B 27/286* (2013.01); *G02B 5/3016* (2013.01); *G02B 5/3083* (2013.01)

(58) Field of Classification Search
CPC ...... G02B 27/286; G02B 5/30; G02B 5/3016; G02B 5/3083; B05D 3/007; B05D 3/067; B05D 5/06
USPC ..................................... 359/494.01
See application file for complete search history.

(56) References Cited

U.S. PATENT DOCUMENTS

| | | | |
|---|---|---|---|
| 3,433,553 A | 3/1969 | Peters | |
| 6,055,103 A | 4/2000 | Woodgate et al. | |
| 6,590,605 B1* | 7/2003 | Eichenlaub | H04N 13/0409 348/42 |
| 8,111,458 B2 | 2/2012 | Murooka et al. | |
| 8,696,134 B2 | 4/2014 | Murakawa et al. | |
| 2008/0049321 A1 | 2/2008 | McEldowney et al. | |
| 2009/0016191 A1* | 1/2009 | Murata | G11B 7/1353 369/110.01 |
| 2009/0257106 A1* | 10/2009 | Tan | G02B 27/48 359/279 |

(Continued)

FOREIGN PATENT DOCUMENTS

WO   2013128446 A1   9/2013

OTHER PUBLICATIONS

International Search Report with Written Opinion, mailed Jan. 14, 2016, for corresponding international application PCT/US2015/049824.

(Continued)

*Primary Examiner* — Frank Font
(74) *Attorney, Agent, or Firm* — Graham Curtin, P.A.

(57) ABSTRACT

A depolarizer, including: a photoalignment layer deposited on the substrate; and a birefringent layer deposited on the photoalignment layer; wherein the photoalignment layer includes a plurality of segments, each segment with a different fast axis orientation and a different pretilt angle, such that each segment of the birefringent layer over the corresponding segment of the photoalignment layer has a different fast axis angle and a different birefringent value.

19 Claims, 7 Drawing Sheets

(56) References Cited

U.S. PATENT DOCUMENTS

2010/0045924 A1* 2/2010 Powers .................... G02B 5/23
349/190
2012/0268818 A1 10/2012 Liu et al.
2013/0242365 A1* 9/2013 Koyanagi .............. G02B 27/48
359/207.9

OTHER PUBLICATIONS

Diorio, Nicholas J. Jr,; Fisch, Michael R.; and West, John L.. "Filled Liquid Crystal Depolarizers." Journal of Applied Physics 90, No. 8 (2001): 3675-3678. Accessed at http://digitalcommons.kent.edu/chempubs/5.

* cited by examiner

DEPOLARIZERS AND METHODS OF MAKING THEREOF

CROSS REFERENCES TO RELATED APPLICATIONS

This application claims the benefit of U.S. Provisional Patent Application No. 62/049,789 filed on Sep. 12, 2014. The disclosure and entire teachings of U.S. Provisional Patent Application 62/049,789 are hereby incorporated by reference.

FIELD OF THE INVENTION

The invention generally relates to depolarizers. More particularly, the invention relates to depolarizers that can depolarize a beam of light.

BACKGROUND

Since many optical systems, optical components and samples to be analyzed, exhibit polarization dependent behavior, it is desired to have optical beams that are depolarized, before applying the beam to such samples, optical elements, or detectors. Therefore, there is a need to create an optical element that can substantially depolarize a beam of light, regardless of the size of the beam, its center wavelength, optical linewidth, angle of incidence (or numerical aperture), or the coherence of the beam.

Current solutions for depolarization of light beams are limited by either being heavily depended on the beam being spectrally broadband and large in size (such as the Lyot depolarizer), or being an effective depolarizer only in specific wavelength or small range of wavelengths (such as US 2008/0049321A1). In one example, of an optical system doing spectral analysis of a sample (such as a spectrophotometer), since a sample can be polarization sensitive, it is desired to have the beam applied to the sample depolarized, while at the same time to have the beam be as narrowband as possible, in order to obtain spectral resolution. Additionally, a system such as a spectrophotometer performs the measurement in multiple wavelengths, by scanning the center wavelength of the probe beam over a range of wavelengths. If one was to use a Lyot depolarizer in such a system, the performance would be limited to only beams with at least a ten nanometers of optical bandwidth, as the currently existing depolarizers can only depolarizer large bandwidth, achromatic beams, as described in U.S. Pat. No. 3,433,553A. Additionally, the beam would have to be quite large in size (>6 mm), in order for the currently existing solutions to work, which imposes many limitations on the optical design, and efficiency of detection by the optical detector.

If instead one would choose the depolarizer described in US 2008/0049321A1, the depolarizer, by being a half-wave waveplate, would be limited to work only in one specific wavelength, or in a narrow range of wavelengths, due to the nature of having one monolithic birefringent layer, which would make it an effective depolarizer in only a small range of wavelengths. Additionally, by being a half waveplate, this type of depolarizer outputs a plurality of linearly polarized beams, with different fast axis orientation. But since all the parts of the beam are linearly polarized, its effectiveness as a depolarizer is not perfect. This type of depolarizer is not suitable for such applications that require a large spectral range of operation. In the example above, of a spectral scanning device such a spectrophotometer, the said invention would make the device effective only on a small range of wavelength, of a couple of hundreds of nanometers at most, while the spectrophotometers would usually be used to scan over wavelength ranges of a couple of thousands of nanometers.

Previous work includes the Lyot and wedge type depolarizers, which is the most common commercial products but has significant limitations to the beams it can depolarize. Other proposed solutions (but not yet seen commercially) including scattering depolarizers which cause negative side effects to the beam, temporal depolarizes that change the polarization properties over time, and are limited only to applications with large time scales. Fiber optic depolarizers, which are limited for use only in situations where the beams are confined to a fiber optic delivery system. Lastly, a type of depolarizer that is made of an array of segments with different properties, have been suggested by US2008/0049321A1, and U.S. Pat. No. 8,111,458, all of which describe an array of retarders, which rotate different parts of the beam into different linear polarizations, with different orientation angles for fast axis. While those depolarizers provide a good improvement in terms of limitation on size of beam, and bandwidth of coherent beams, they depolarize the beams in a very limited way, due to being only a plurality of polarization rotators, and can work only in very specific wavelengths, which limit their usability considerably, as one would require having multiple devices in situations of tunable lasers, or broadband sources. The device described in U.S. Pat. No. 8,696,134 improves further by having segments that also have different phase delays (similar to our invention), but is complicated and costly to manufacture, as it requires significant work in order to produce it, and is therefore not practical. Additionally, by having the segments have different thicknesses, the design has significant side effects of reflections, scattering and diffraction effects, caused by the uneven surface of the device.

Figure 1:
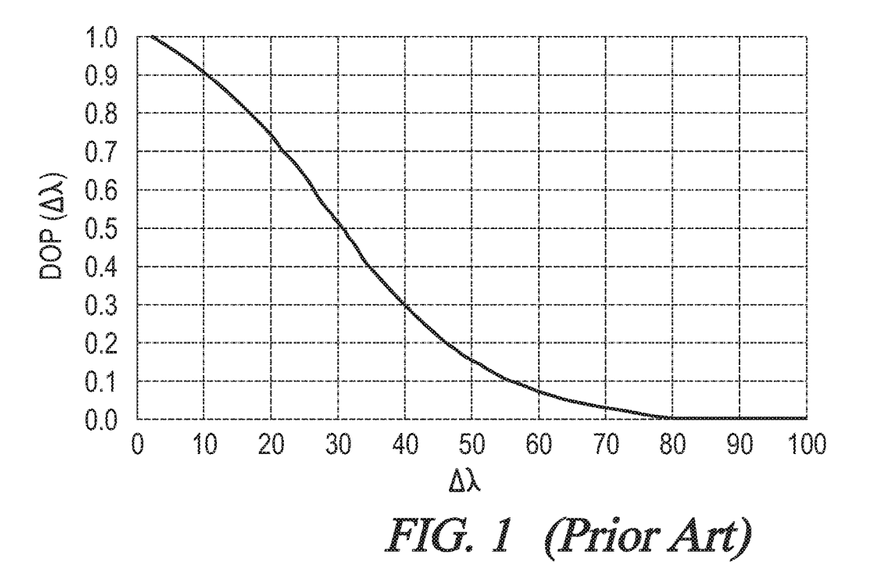
FIG. 1 illustrates the effectiveness of a Lyot depolarizer as a function of bandwidth.

A Lyot and wedge type depolarizers are made by combining two birefringent materials, with different thicknesses, in a way that creates a spatially varying fast axis. First described in the 1930s, this type of depolarizer is commonly available today from many commercial providers, and is commonly used in achromatic systems, where the beams are very broadband, and large in physical size. As can be seen in the graph in FIG. 1 (DOP vs. Wavelength Bandwidth; laser beam wavelength of 1064 nm, with total length of 6 mm) the effectiveness of a Lyot type depolarizer greatly depends on the bandwidth of the beam. Typically, commercial vendors for Lyot depolarizers, specify the depolarizer as being effective only for beams with an optical bandwidth greater than 50 nm. FIG. 1 shows the effectiveness of a Lyot depolarizer as a function of the source's bandwidth. Note that lower degree of polarization (DOP) is desired.

However, a typical application that requires depolarization involves, for example, the use of a broadband source which is then spectrally filtered down to a narrow bandwidth beam, often by using a grating or other means of tunable spectral filtering. The narrow bandwidth beam, which often has a bandwidth in the order of 0.1 nm, is then applied to a sample to be tested for wavelength dependent transmission and reflection. The resulting beam is then detected to identify wavelength dependent behavior. This is then repeated hundreds or thousands of times, each time after tuning slightly the filtered wavelength, such that the spectral dependence of a sample can be obtained across thousands of individual wavelengths, in a broad range of wavelengths. Since the sample tested often has some dependence to polarization, it is required that the beam applied to the sample be depolarized. However, since the available depolarizers can only work for broadband beams, the existing solutions cannot provide a useful solution for such a case.

Some variations on the classic Lyot solution all contain two or more optical elements, which create some spatial variation to the polarization, such as wedge depolarizers. Those can decrease the minimum required beam size, but have a significant disadvantage of causing a beam deviation, due to the angle between the wedged glass elements, making this type of depolarizer not practical.

Another type of proposed solutions has arrays of half-wave waveplates, with different orientation axis, across the clear aperture. Examples include US patent US2008/0049321A1 and U.S. Pat. No. 8,111,458, in which a plurality of segments is proposed, each segment having a different fast axis orientation, and all segments sharing the same amount of birefringence, by having one homogeneous birefringent layer. In effect those solutions create an array of half-wave waveplates, where all the segments in this array act as half-wave waveplates, but with different angles of alignment for their respective fast axis. This in effect divides the incoming beam into multiple beams, and rotates the polarization axis of each such sub-beam going through each segment in a different amount. This allows the creation of arrays with very small segment sizes, and thus can significantly reduce the requirements of the minimum beam size that can be depolarized, as compare to the classic Lyot depolarizer. However, since these devices only vary the fast axis of each segment, but still use one layer of homogeneous birefringent material, it is effective only for cases where the value of birefringence equals exactly a half wave of the wavelength of the incident beam, as it can only effectively rotate the fast axis in the case that the wavelength of the beam applied to the device equals exactly twice the value of the half-wave of the device, dictated by the homogeneous birefringent layer. In other words, the above discussed devices act effectively as a depolarizer only for incident beams with a wavelength equal twice its birefringence value.

Another type of depolarizer that was proposed and discussed in the literature is a scattering type depolarizer. This depolarizer such as the one described in the paper titled "liquid crystal depolarizers" Journal of applied physics, Volume 90, number 15, October 2001, and a similar one described in U.S. Pat. No. 3,433,553, can create a depolarization effect, but with the cost of the side effect of scattering, and diffraction effects. Such side effects cause a portion the beam passing through the depolarizer to split out of the main beam, and continue to propagate in another direction, or a different angle. Since very often the beam to be depolarized is used for very accurate and tightly controlled measurements (such as the spectral measurement of a sample mentioned above), it is required to confine the beam to a tightly defined space, or area, and not have any parts of the beam scatter around and affect the measurement. This scattering effect is therefore very disruptive, and therefore such depolarizers with a scattering side effect are not commonly used.

U.S. Pat. No. 8,696,134 provides a further enhancement to the devices mentioned above, by adding an additional dimension of variation between the pixels of the array, in which the additional dimension provides a difference in phase delay between the different pixels. This in effect makes the device into having two variables: the difference in fast axis, and a difference in phase delay, which leads to a difference in birefringence between axes. This difference in birefringence makes the device an efficient depolarizer for multiple wavelengths, due to the multiple different birefringence values within the array. This in turn makes in a depolarizer that can handle small beams (due to the small pixel sizes), handle narrowband beams (due to variety of values within the pixels), but also handle beams with multiple wavelengths, or multiple beams with different wavelengths, or changing wavelengths, due to the variety of birefringence values across the clear aperture. This device is however extremely difficult and costly to manufacture, due to the required additional steps needed to create the different values of birefringence (by modifying the surface of the birefringent layer), and has significant side effects to the optical quality of the beam, primarily scattering, wavefront distortion, and diffraction, due to uneven surface of the device, needed to create the varying birefringent layer, in this method.

Therefore, there is a need to have a depolarizer that overcomes the above mentioned difficulties in the existing devices and yet can substantially depolarize a beam of light, regardless of the size of the beam, its center wavelength, optical linewidth, angle of incidence (or numerical aperture), or the coherence of the beam.

SUMMARY

One embodiment is a depolarizer array, for use with both coherent and incoherent sources, as well as tunable coherent sources, and with beams as small as half a millimeter in diameter, for example. In one embodiment, the depolarizer array includes multiple segments with different fast axis orientation, as well as different retardation values, made of at least one birefringent layer, with varying fast axis, and varying pre-tilt angles. Additionally, the depolarizer array can be made to be completely achromatic, or also to have a retardation value which changes with time, for temporal, as well as spatial depolarization. Accordingly, any beam of light applied to the device will be substantially depolarized, regardless of wavelength, and beam size.

One embodiment of the invention provides a depolarizer, including: a photoalignment layer; and a birefringent layer deposited on the photoalignment layer; wherein the photoalignment layer includes a plurality of segments, each of the plurality of segments with at least one of a different fast axis orientation and a different pretilt angle, such that each of the plurality of segments of the birefringent layer over the corresponding segment of the photoalignment layer has at least one of a different fast axis angle and a different birefringent value.

Another embodiment of the invention provides a stack of depolarizers, including: a first depolarizer and one or more second depolarizer, each of the first depolarizer and the one or more second depolarizer being a depolarizer of the above; wherein the first depolarizer's photoalignment layer is different from the one or more second depolarizer's photoalignment layer at least in one of segment, fast axis orientation and pretilt angle.

Another embodiment of the invention provides a depolarizer, including: a first substrate; a first photoalignment layer deposited on the first substrate; an active birefringent layer deposited on the first photoalignment layer; a second photoalignment layer deposited on the active birefringent layer; and a second substrate deposited on the second photoalignment layer; wherein the first and second photoalignment layers comprise a plurality of segments, each segment with a different fast axis orientation and a different pretilt angle, such that each segment of the active birefringent layer over the corresponding segment of the photoalignment layers has a different fast axis angle and a different birefringent value; and wherein the active birefringent layer is further configured to vary its birefringent value in response to an applied voltage.

Yet another embodiment of the invention provides a method of manufacturing a depolarizer, including: applying a layer of photoalignment material on a substrate; scanning a beam over a plurality of segments of the photoalignment layer, with at least one of a different power, a different polarization angle and a different duration of the beam over each segment, in order to create a different fast axis orientation and a different pretilt angle in each segment; applying a layer of birefringent material over the cured photoalignment layer, wherein the birefringent material comprises molecules that automatically arrange themselves to the alignment layer's fast axis orientations and pretilt angles; and stabilizing the molecules in the birefringent layer.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

In one embodiment, a depolarizer has a plurality of spatially separated segments, which has both spatial changes of fast axis of the different segments of the device, as well as changes in the retardation value of the segments. In one embodiment, the device is produced using a photoalignment technique, followed by coating (preferably spin coating) of a birefringent material. This three step process allows for very fast, efficient and cost saving production, enabling efficient mass production of the device, typically within a few minutes. Furthermore, in some other embodiments, the retardation values of the device are designed in such a way that they are either achromatic (provide the same or similar retardation value over a large range of wavelengths), or tunable, allowing the user to dynamically change them according to the working wavelength of his system.

Other previously proposed devices are designed to either work in specific wavelengths (due to the single homogeneous layer of birefringent materials), or are limited to beam above a certain beam diameter, and with a wide bandwidth (not a coherent beam such as a laser), as in the case of a classic Lyot depolarizer.

Figure 2:
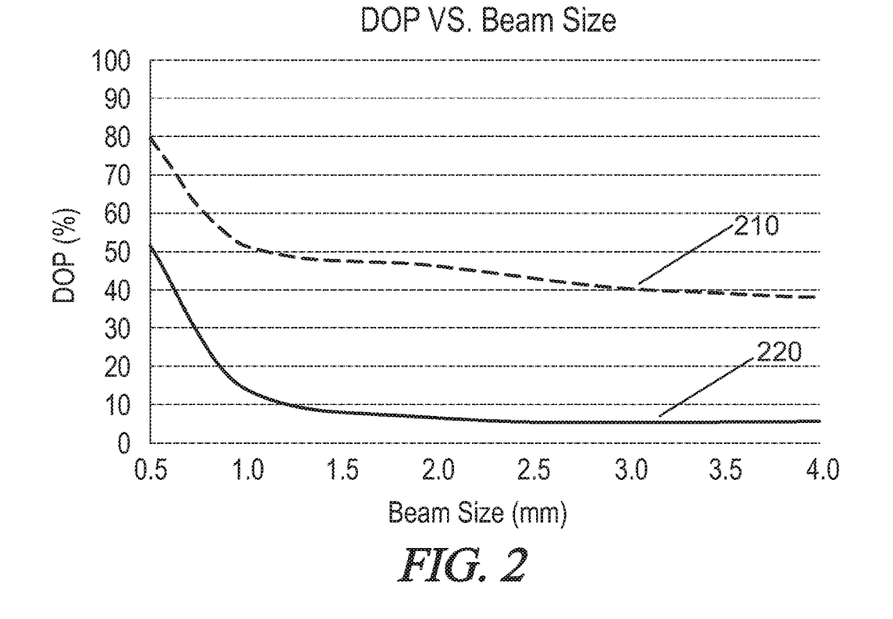
FIG. 2 is a comparison in performance between a Lyot type depolarizer, and a depolarizer according to an embodiment.

FIG. 2 is a comparison in performance between a Lyot type depolarizer, and an embodiment of the present invention. The Y axis indicates the measured degree of polarization (DOP). In a polarized beam, this would be 100%, in a perfectly depolarized beam this would be 0%. As indicated above and in existing publications, the Lyot type depolarizer is limited in its ability to depolarize small sized beams. In this measured result, the degree of polarization (DOP) for different beam sizes is compared for a Lyot type depolarizer and a depolarizer according to an embodiment of the present invention. As can be seen from the plot 220, the embodiment can significantly depolarize beams to a very low DOP of 10% or less, even for beams as large as 1 mm diameter. The plot 210 of the Lyot type depolarizer, on the other hand, depolarizes only to 40% depolarization, and only for beams larger then 3 mm in diameter.

In solutions disclosed earlier (US patents 2008/0049321A1, and U.S. Pat. No. 8,111,458), the depolarizers has multiple segments, with varying fast axis of the segments, and one layer of equal amount of birefringence for all segments, making this device effectively a collection of half-wave waveplates that rotate the fast axis of each segment in a different amount. Those devices are an effective depolarizer, however since they only have one birefringence value across the whole device, they are effective only for a very small range of wavelengths. Additionally, those proposed devices, by being a collection of half-wave waveplate, can not completely depolarize a beam, and can only reduce its degree of polarization).

Figure 3A:
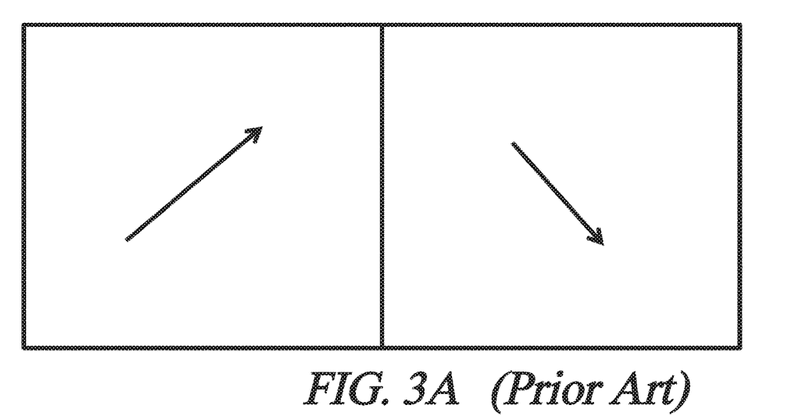
FIGS. 3A-3C illustrate an existing depolarizer.
Figure 3B:
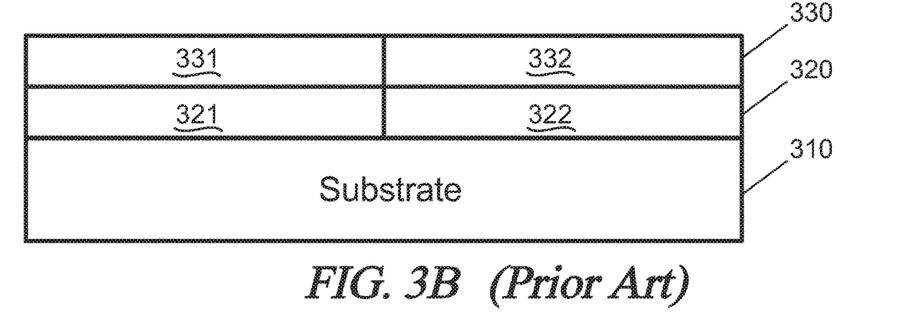
Figure 3C:
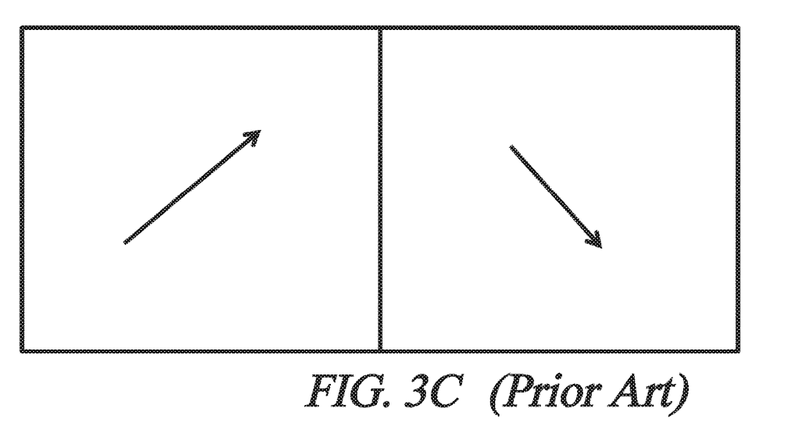

FIGS. 3A-3C illustrate an existing depolarizer. FIG. 3A is the top view and FIG. 3B is the side view of the depolarizer. For simplicity, two segments are illustrated just for illustration purposes. Usually such devices would have multiple segments. An alignment layer 320 is applied on a substrate 310. The alignment layer 320 is segmented into two segments 321, 322, each segment with a different fast axis orientation. For example, one segment 321 has a fast axis of 45 degrees and the other segment 322 has a fast axis of 135 degrees. A homogenous birefringent layer 330 is then applied. For example a layer with a thickness that will lead to a retardation of 325 nm (half wave for a 650 nm laser). Since the pretilt angle is not controlled separately, the two segments 331, 332 have the same retardation 325 nm. Therefore, as shown in FIG. 3C, if for example, a light beam with a wavelength of 650 nm and linear polarization is applied, the output from the two segments would be two polarizations, both linear, with different axis angles (e.g., 50 degrees and 140 degrees), depending of course on the fast axis orientation of the beam applied to the device.

Another type of device (U.S. Pat. No. 8,696,134) includes an array of pixels with different birefringence values and different fast axis orientation, which make it a very efficient depolarizer, for a wide range of wavelengths. This device however requires a very complicated manufacturing process, making it impractical, and expensive.

Figure 4A:
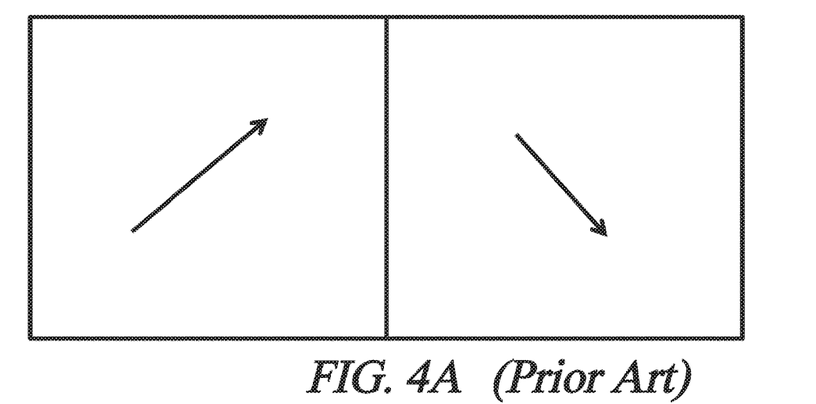
FIGS. 4A-4C illustrate another existing depolarizer.
Figure 4B:
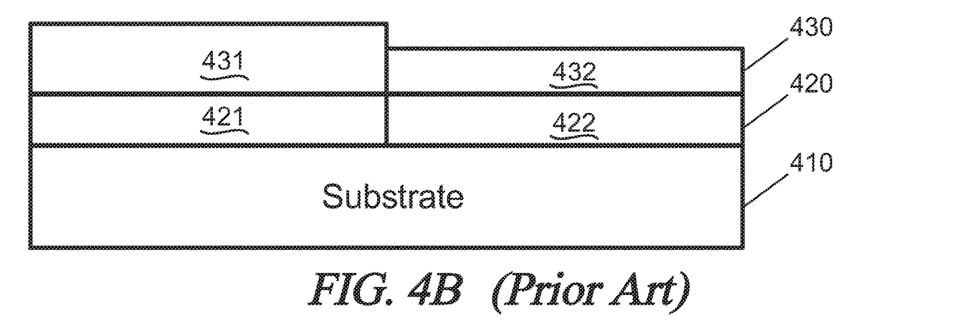
Figure 4C:
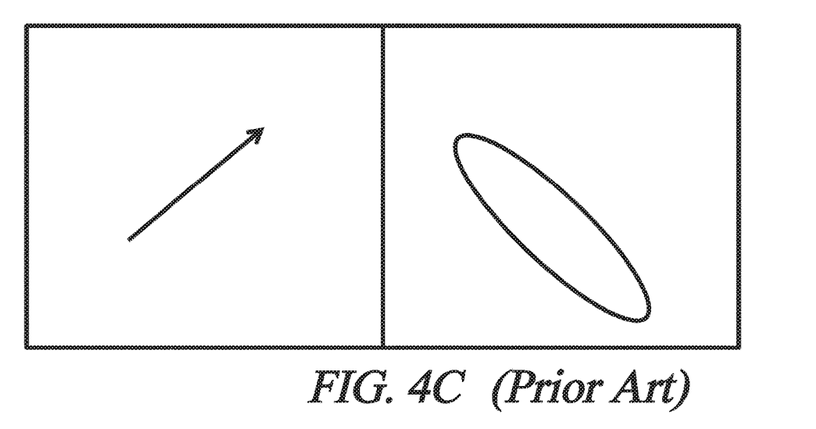

FIGS. 4A-4C illustrate an existing depolarizer. FIG. 4A is the top view and FIG. 4B is the side view of the depolarizer. For simplicity, two segments are illustrated just for illustration purposes. Usually such devices would have multiple segments. An alignment layer 420 is applied on a glass substrate 410. The alignment layer 420 is segmented into two segments 421, 422, each segment with a different fast axis orientation. For example, one segment 421 has a fast axis of 45 degrees and the other segment 422 has a fast axis of 135 degrees. A birefringent layer 430 is applied, and using additional processing steps, the thickness of the birefringence layer, is altered, in different segments. In this example, FIG. 4B demonstrates a layer with two different thicknesses. Since the retardation is set by $\Delta n \cdot d$, where d is the layer's thickness and $\Delta n$ is the birefringence, which is effected by the type of material, molecule tilt angle, temperature, and more. Since the thickness of the layer is different between the two segments, this will lead to a difference in retardation, resulting in retardation values (for example) of 300 nm in one segment 432, and 325 nm in another segment 431. Therefore, as shown in FIG. 4C, if for example, a light beam with a wavelength of 650 nm and linear polarization is applied, the output from the two segments would be two polarizations, one linear, and one elliptical, leading to a more efficient depolarization. Furthermore, if a broadband light source, or two separate light sources with different wavelengths are applied, the difference in retardation will ensure considerably more efficient depolarization, of both sources (or the broadband source), in comparison to the previous method. However, controlling the retardation by controlling the layer thickness requires many more complicated and expensive manufacturing steps, and adds considerable complexity to the manufacturing process. Therefore, this approach is not desirable.

An embodiment of the invention provides a device that has a plurality of segments, with distinctive values for each segment of both the fast axis orientation, as well as the value of retardation, and is produced in a fast, inexpensive and efficient method. By having distinctive values of both retardation and fast axis, one can create in effect an array of waveplates that can rotate and convert the polarization almost independent of wavelength and beam size.

One embodiment of the invention makes use of photoalignment of liquid crystals, by using a writing beam that can determine both the orientation angle (controlling the fast axis angle), and the pretilt angle (controlling the birefringence value), of each segment of the depolarizer array separately. A liquid crystal device includes liquid crystal molecules that exhibit birefringence when aligned according to an external force. Such an external force is achieved using an alignment layer at the border of the liquid crystal molecules, such that the force leads the molecules to be aligned according the angle of alignment and fast axis orientation of that alignment layer. Additionally, the pretilt angle created by the alignment layer will determine the tilt angle of the liquid crystal molecules. A different tilt angle of the liquid crystal molecules leads to a different value of birefringence. In an active liquid crystal device, for example, alignment layers on both sides of the liquid crystal determine the fast axis alignment, as well as the pretilt angle for the molecules in the active layer. As long as no other forces are applied (such as magnetic or electrical fields), the molecules will self-arrange according the pretilt angle, and fast axis angle of the alignment layer. As the birefringence value of a liquid crystal depends on the side view of its molecules, the tilt angle of the liquid crystal molecules, dictates in effect the value of birefringence of the device. In an active device, for example, once an electric field is applied, the tilt angle will change (according to the strength and direction of the electric field), and the molecules will rotate, leading to a change in birefringence.

Figure 5A:
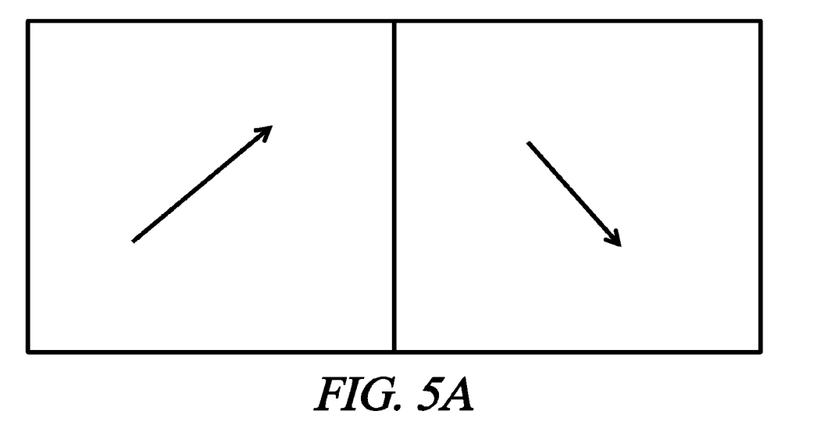
FIGS. 5A-5C illustrate a depolarizer according to an embodiment.
Figure 5B:
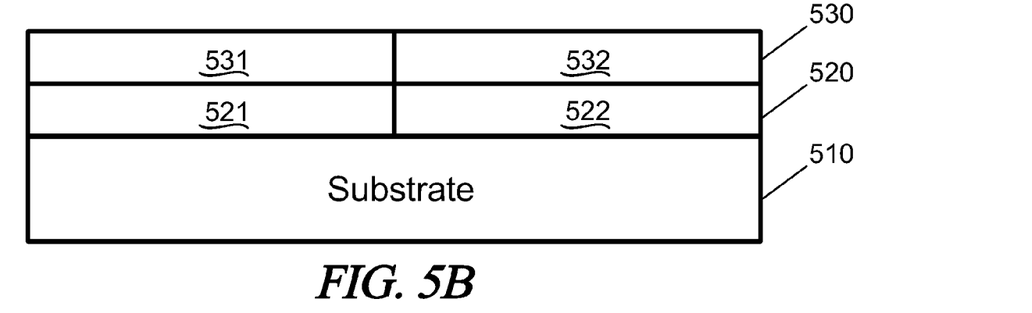

FIGS. 5A-5C illustrate a depolarizer according to an embodiment. FIG. 5A is the top view and FIG. 5B is the side view of the depolarizer. For simplicity, two segments are illustrated just for illustration purposes. Usually such devices would have multiple segments. An alignment layer 520 is applied on a substrate 510. The substrate 510 may be a glass substrate (transparent) or a mirror (reflective). The alignment layer 520 is segmented into two segments 521, 522, each segment with a different fast axis orientation and a different pretilt angle. For example, one segment 521 has a fast axis of 45 degrees and a pretilt angle of 5 degrees, and the other segment 522 has a fast axis of 135 degrees a pretilt angle of 3 degrees. A birefringent layer 530 is applied, and since the two segments have a different pretilt angle, the effective retardation is different between the two segments. Since the retardation is set by $\Delta n \cdot d$, where d is the layer's thickness and $\Delta n$ is the birefringence, which is effected by the type of material, molecule tilt angle, temperature, and more. Since the pre-tilt angle is different between each segment, this will lead to a difference in retardation, resulting in one retardation value in one segment 532, and another retardation value in another segment 531. Controlling the retardation by controlling the pretilt angle according to an embodiment is a much simpler and easier solution than controlling the layer thickness, and it does not require any additional steps in the production.

Figure 5C:
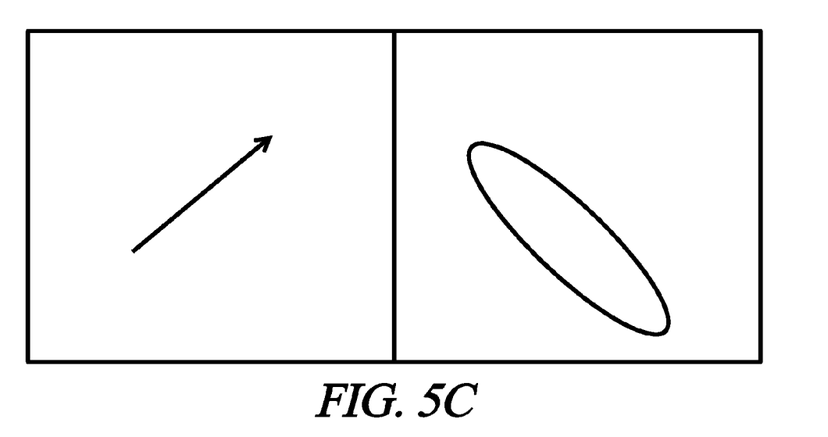

Therefore, as shown in FIG. 5C, if for example, a light beam with a wavelength of 650 nm and linear polarization is applied, the output from the two segments would be two polarizations, one linear, and one elliptical, leading to a more efficient depolarization. Furthermore, if a broadband light source, or two separate light sources with different wavelengths are applied, the difference in retardation will ensure considerably more efficient depolarization, of both sources (or the broadband source), in comparison to the previous method.

Note that while the above example embodiment illustrate a different fast axis orientation and a different pretilt angle in each segment, it is possible to have two different segments that have the same fast axis orientation and different pretilt angles, or two segments that have different fast axis orientations but the same pretilt angle, or two segments that have both different fast axis orientations and different pretilt angles. For each segment, at least one of the pretilt angle and fast axis orientation is varied in different ways or amounts.

Until recently, the standard method for creating the alignment layer has been using mechanically created micro grooves on the surface of the alignment layer by for example, rubbing a fine cloth on the surface of the alignment layer. Those micro grooves determine the fast axis orientation (direction of the groove), and pretilt angle (depth of the groove, together with the mechanical and chemical characteristics of the alignment material). However, in this method, the entire surface of the device is usually aligned in the same direction and amount, as it is not possible to change the mechanical rubbing spatially.

In recent years, a new solution for creating the alignment layer has been developed in the form of photoalignment. By using a light sensitive material, the direction and strength of alignment in the alignment layer can be controlled using a writing beam, typically of a UV or blue wavelength. In other embodiments, the writing beam is an electron beam, a different wavelength beam or other beams that excites the photoalignment material. In the example of an SD-1 type of photoalignment material (made of Azo-Dye materials), the angle of polarization of the writing beam determines the alignment angle (fast axis orientation), and the level of energy of the beam, controls the pretilt angle of the alignment layer. Using this technique, one embodiment of the invention can create an alignment layer which can have a plurality of segments, each segment with a different fast axis orientation and different pretilt angle. Once a layer of birefringent material, such as liquid crystal, is applied on top of the photoalignment layer, the molecules will arrange their orientation and tilt angle according to the anchoring energy and direction of the photoalignment materials, and it will result in a birefringent device, with a plurality of segments with each segment acting as a different waveplate, with different values of fast axis orientation, as well as different values of birefringence. Effectively the depolarizer becomes a collection of waveplates that are each optimized for different conditions, making it an effective depolarizer for a very wide range of conditions, such as different wavelengths, different bandwidths and more.

Figure 6:
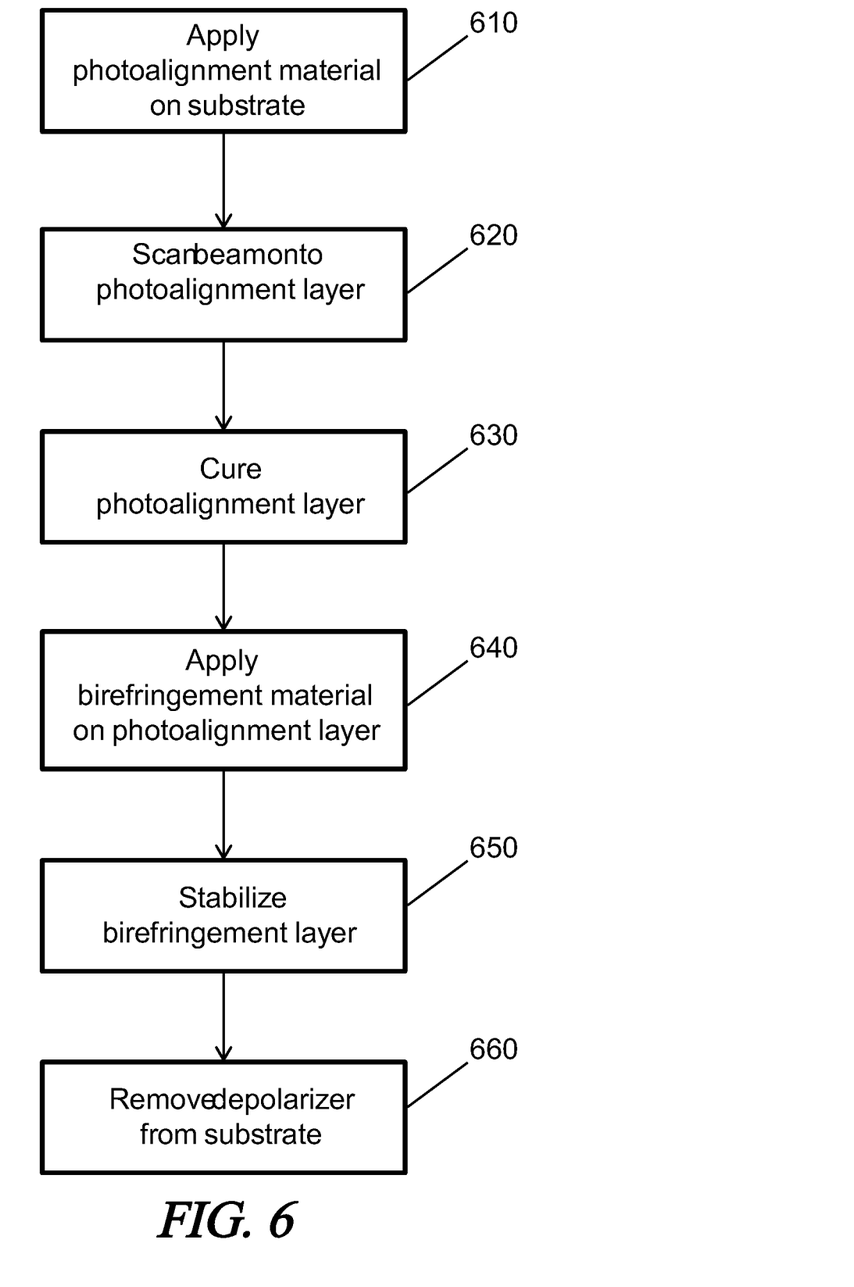
FIG. 6 illustrates the process of manufacturing a depolarizer according to an embodiment.

FIG. 6 illustrates the production process for a depolarizer according to an embodiment. In 610, an optically transparent material, such as glass or plastic, is coated (preferably using spin coating, or bar coating) with a thin layer of photoalignment material, such as Azo-Dye material. The coated material would then in some cases be treated by heat, in other cases it would not require any heat treatment. In 620, the photoalignment material is then exposed to the writing beam, which is typically a UV beam, or blue light beam that is either collimated, or focused at the surface of the material. The writing beam then scans across the entire surface spatially, and at each location, the power, polarization angle and duration of exposure is varied, such that an array of alignment and pre-tilt conditions is created. Next, in 630, the photo alignment material is cured, if needed. This curing can either be with heat treatment, or with the use of a second coated layer that stabilizes the first photo-alignment layer. Such curing conditions depend on the exact material used. After the curing of the alignment layer, in 640, a layer of liquid crystal polymer (also known as reactive mesogen) is applied, also by coating such as spin coating or bar coating. Once applied, the molecules in that material will automatically arrange themselves to the alignment layer's multiple fast axis angles and multiple pre-tilt angles, creating the array of multiple waveplates with different fast axis angles and pre-tilt angles. After which, in 650, a UV beam is applied, which causes the material to solidify and thus "locks in" the position of the LC molecules. In some cases, one might add a second protective window above, to protect from physical damage. In some applications, it is desirable to use the depolarizer alone without a substrate or to apply the depolarizer on a different substrate. In 660, the depolarizer is removed from the substrate, for example, by peeling the layers off the substrate.

By controlling the exposure time of the writing beam, and/or the power values of the said writing beam, the process can effectively control the level of energy delivered to the photoalignment material, and thus control the pretilt angle of the photo alignment layer. Since the birefringence value of the birefringent layer applied above depends on both the properties of the material and the pre-tilt angle dictated by the photoalignment layer, the process can in effect modify the value of the birefringence of the birefringent layer, in such a way that different birefringent values can be assigned, to different segments of the device.

Additionally the process can control the fast axis orientation of each segment independently, thus creating a device that has spatially varying fast axis, and spatially varying birefringence. Adding this extra degree of control allows the creation of a device that alters the polarization of an applied beam in multiple ways, creating a significantly stronger depolarization effect, over a significantly wider wavelength range, and independent of beam size and bandwidth.

Furthermore, since the photoalignment material is by itself also birefringent, there is in effect a multi-layer device (two birefringent layers), which provide much bigger design flexibility, and allow to produce a complex depolarizer, with a much more detailed polarization transfer function (compare to existing monolithic devices), thus allowing again for a much stronger depolarization effect, regardless of wavelength, bandwidth and beam size.

Figure 7:
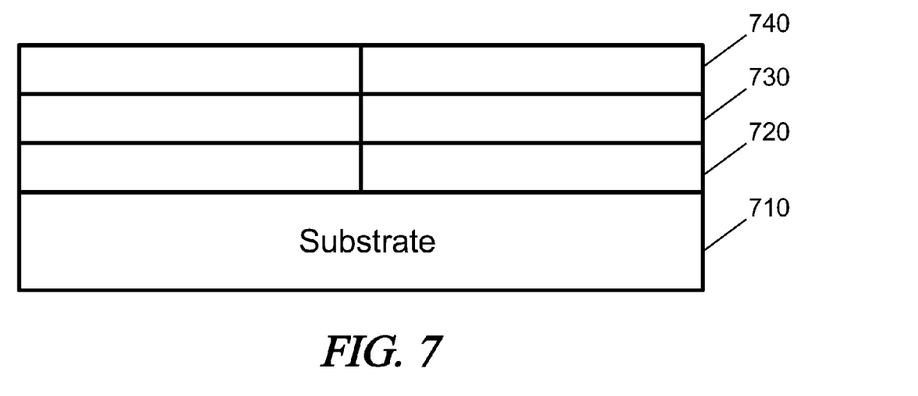
FIG. 7 illustrates a depolarizer according to an embodiment.

As shown in FIG. 7, in another embodiment, a photoalignment material 720 is on top of the substrate 710, and on top of the photoalignment material 720, there are multiple (two or more) layers of birefringent materials 730, 740, each layer with a different birefringence and dispersion values. One example is a coat of a standard (positive dispersion slope), birefringent material, followed by a second layer, with a negative birefringence dispersion slope. After coating the first layer, its molecules will be aligned (both fast axis and pretilt alignment) to the photoalignment layer below. After coating the second layer, the molecules of the second layer will get aligned according the first layer, effectively also getting aligned to the axis orientation and pretilt angle of the photoalignment material. By having two or more layers of birefringent materials, with different dispersion slopes, the process makes each segment into a unique achromatic waveplate and creates a depolarizer whose performance is independent of the applied wavelength. As achromatic waveplates, each segment will exhibit the same birefringence value for any light beam applied, within a very large wavelength range.

Figure 8:
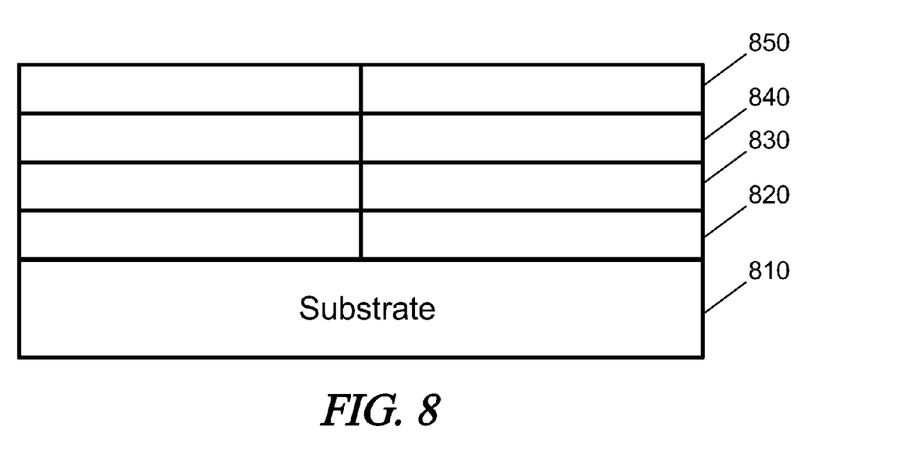
FIG. 8 illustrates a depolarizer according to another embodiment.

As shown in FIG. 8, in another embodiment, a photoalignment material 820 is on top of the substrate 810, and a birefringent material 830 is applied on top of the photoalignment 820. A second photoalignment layer 840 is applied above the layer of birefringent material 830 (first layer of birefringent material, or the Nth layer in case of the multilayer device described earlier). This second photoalignment layer 840 is then segmented and aligned in a similar way to the first photoalignment layer, but with different values, either in the fast axis orientations, the pretilt angle, or the geometrical properties of the segments, such as size and location. Then another one or more layer of birefringent material 850 is applied on the second photoalignment layer 840, and is aligned according to the properties of the second photoalignment layer 840. In one embodiment, the second photoalignment layer is segmented in a way that some of its segments overlap in spatial dimensions to the segments of the first photoalignment layer. In other embodiment, the photoalignment layers are segmented in different size, shape and location of segments. This adds another element of freedom in the design, by creating such as sub segments, or higher resolution of segments, allowing for further geometrical segmentation, and the use of more complex polarization transfer function (by having multiple layers at different orientations), thus creating an even more effective depolarizer element.

Note that the depolarizers discussed above do not have to be manufactured as a single part. In one embodiment, the depolarizer is made in two parts, and then gluing them together. The first part is a glass with the alignment layer and birefringent layer. The second part is a second glass with the same (but different segments/orientation angles and/or pretilt in that second glass). Then the two parts are stacked or glued together (or just hold them one after the other without even touching), and they make essentially the same type of depolarizer as discussed above.

Figure 9:
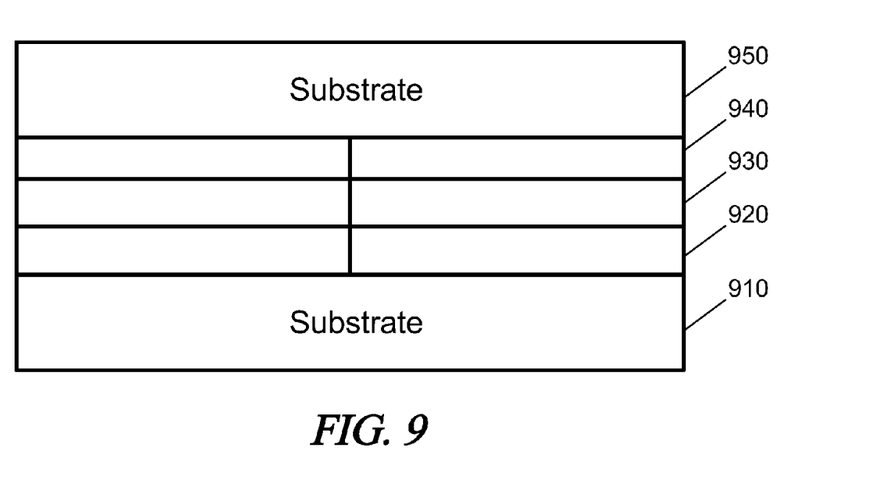
FIG. 9 illustrates a depolarizer according to another embodiment.

As shown in FIG. 9, in another embodiment, a first photoalignment material 920 is on top of the substrate 910. Instead of a layer of material with fixed birefringence properties, an active layer of liquid crystal material 930 is applied between the first photoalignment layer 920 and a second photoalignment layer 940. A substrate 950 is applied on top of the second photoalignment layer 940. The active liquid crystal material will still be aligned according to the pattern in the photoalignment layers, and its molecules will still be pretilted according to the photoalignment layers' pretilt angle, but the basic value of birefringence of the active liquid crystal material will be controlled by an externally applied field, such as voltage, in addition to the pre-tilt angle control. This structure allows for a third degree of control (the fixed alignment of fast axis, the fixed alignment pre-tilt angles, and the dynamic control of the active tilt angle and thus the liquid crystal's birefringence properties). By having this extra degree of control, the value of birefringence can be modified over time, thus allowing to either adjust it according to the operating wavelength (to optimize to the wavelength of a specific light source), and/or to change the value dynamically in order to change the polarization properties over time, creating a depolarizer that not only depolarizes a beam in spatial domain, but also in time domain.

The different pretilt angles cause the liquid crystal molecules to arrange in different tilt angles, along the propagation axis. As a result, a beam passing perpendicular to the surface, will see a different value of birefringence, for the two different pretilt angles, and there for the beam's polarization will be varied differently. In addition, since two separate values of retardation exists. As opposed to previous inventions that have a uniform layer of birefringent material, the different pretilt angles throughout our device, lead to a variation in both retardation and fast axis angle across the device, and for any beam applied to it. As a result, the device is capable of significantly depolarizing even monochromatic beams, which until now where not possible.

In certain embodiments, the above mentioned depolarizer are made reflective (which works as a mirror as well as being a depolarizer), by having the substrate be a reflective substrate such as a mirror, or a glass coated with a single layer, or multiple layers reflective coating. These reflective depolarizers have an additional function of being both a mirror and a depolarizer. An advantage of these reflective depolarizers is that it would save the user of having two separate optical components. Note that in making such cases reflective depolarizers, the values of birefringence will need to be adjusted to account for the beam passing twice through the birefringent layer(s).

In one embodiment, a substrate is used only during production of the depolarizer, (and does not have to be transparent or reflective), and after production is completed, the depolarizer is removed from the substrate, by means of, for example, peeling off, and then the depolarizer is used without any substrate, or is glued on to a different substrate.

Figure 10:
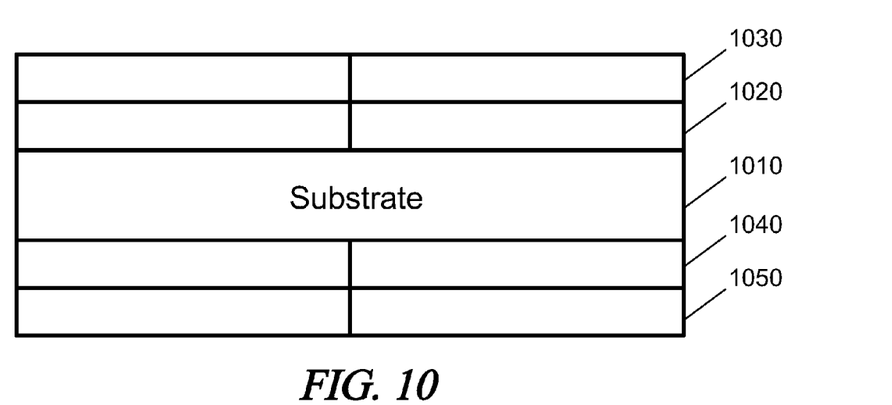
FIG. 10 illustrates a depolarizer according to another embodiment.

In another embodiment, both sides of a transparent substrate are used for depositing the photoalignment layers. As shown in FIG. 10, there are two photoalignment layers 1020, 1040, one on the top surface of the substrate 1010, and the other on the bottom surface of the substrate 1010. Similar to above, the top photoalignment layers 1020 is covered by a birefringement layer 1030. The bottom photoalignment layers 1040 is covered by another birefringence layer 1050. Just like above, each of the photoalignment layers comprises a plurality of segments, each segment with at least one of a different fast axis orientation and a different pretilt angle, such that each segment of the birefringement layer over the corresponding segment of the photoalignment layer has at least one of a different fast axis angle and a different birefringent value. In one embodiment, the top depolarizer is different from the bottom depolarizer at least in one of segment, fast axis orientation and pretilt angle. Furthermore, one or more further depolarizer can be added on top or on the bottom of the device.

In one embodiment, multiple depolarizers are stacked or glued together. These multiple depolarizers differ from each other by at least one of segment, fast axis orientation and pretilt angle. Therefore a more effective and flexible depolarizer stack is formed with a number of a variety of depolarizers according to some embodiments discussed above.

Depolarizers according to various embodiments have many unique advantages over existing devices. Previously, the common practice has been to use a Lyot depolarizer, which is composed of two birefringent materials, and has a significant limitation in being able to operate only for achromatic beams (bandwidth>10 nm), and for beam sized greater the 6 mm. Another approach is to have a depolarizer array that is made of segments with different polarization fast axis, but with one homogenous birefringent layer above. As the layer above has a homogenous birefringence value, a monochromatic light passing through the various segments will have its polarization state rotated by different angles (according to the value of the fats axis angles), but its polarization state will not be modified. If for example a linearly polarized light will be applied, the lights exiting all segments will have different fast axis angles for different segments, but each segment will still be linearly polarized. A device according to one embodiment, on the other hand, by having segments with different birefringence values, in addition to different fast axis values, will further modify the polarization, and will depolarize even light beams with very narrow bandwidth, as low as 0.1 nm or less.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A depolarizer, comprising:
a first photoalignment layer; and
a first birefringent layer deposited on the first photoalignment layer;
wherein the first photoalignment layer comprises a first plurality of segments, each of the first plurality of segments with at least one of a different fast axis orientation and a different pretilt angle, such that each of a first plurality of segments of the first birefringent layer over the corresponding segment of the first photoalignment layer has at least one of a first different fast axis angle and a first different birefringent value.

2. The depolarizer of claim 1, further comprising one or more second birefringent layer deposited on the first birefringent layer.

3. The depolarizer of claim 2, wherein the first birefringent layer has a first dispersion slope and the one or more second birefringent layer has a second dispersion slope.

4. The depolarizer of claim 3, wherein one of the first and second dispersion slopes is positive and the other is negative.

5. The depolarizer of claim 1, further comprising:
a second photoalignment layer arranged over the first birefringent layer; and
a second birefringent layer deposited on the second photoalignment layer;
wherein the second photoalignment layer comprises a second plurality of segments, each of the second plurality of segments with at least one of a second different fast axis orientation and a second different pretilt angle, such that each of the second plurality of segments of the second birefringent layer over the corresponding segment of the second photoalignment layer has at least one of a second different fast axis angle and a second different birefringent value.

6. The depolarizer of claim 5, wherein the first plurality of segments overlaps partially with the second plurality of segments.

7. The depolarizer of claim 5, wherein a shape or a size of the first plurality of segments is different from a shape or a size of the second plurality of segments.

8. The depolarizer of claim 1, wherein the first photoalignment layer is deposited on a first surface of a substrate.

9. The depolarizer of claim 8, wherein the substrate is reflective.

10. The depolarizer of claim 8, wherein the substrate is transparent.

11. The depolarizer of claim 10, further comprising:
a second photoalignment layer deposited on the opposite surface of the first surface of the substrate; and
a second birefringent layer deposited on the second photoalignment layer;
wherein the second photoalignment layer comprises a second plurality of segments, each of the second plurality of segments with at least one of a second different fast axis orientation and a second different pretilt angle, such that each of the second plurality of segments of the second birefringent layer over the corresponding segment of the second photoalignment layer has at least one of a second different fast axis angle and a second different birefringent value.

12. A stack of depolarizers, comprising:
a first depolarizer and one or more second depolarizer, each of the first depolarizer and the one or more second depolarizer being a depolarizer of claim 1;
wherein the first depolarizer's photoalignment layer is different from the one or more second depolarizer's photoalignment layer at least in one of segment, fast axis orientation and pretilt angle.

13. A depolarizer, comprising:
a first substrate;
a first photoalignment layer deposited on the first substrate;
an active birefringent layer deposited on the first photoalignment layer;
a second photoalignment layer deposited on the active birefringent layer; and
a second substrate deposited on the second photoalignment layer;
wherein the first and second photoalignment layers comprise a plurality of segments, each segment with a different fast axis orientation and a different pretilt angle, such that each segment of the active birefringent layer over the corresponding segment of the photoalignment layers has a different fast axis angle and a different birefringent value; and
wherein the active birefringent layer is further configured to vary its birefringent value in response to an applied voltage.

14. A method of manufacturing a depolarizer, comprising:
applying a layer of photoalignment material on a substrate;
scanning a beam over a plurality of segments of the photoalignment layer, with at least one of a different power, a different polarization angle and a different duration of the beam over each segment, in order to create a different fast axis orientation and a different pretilt angle in each segment;
applying a layer of birefringent material over a cured photoalignment layer, wherein the birefringent material comprises molecules that automatically arrange themselves to the alignment layer's fast axis orientations and pretilt angles; and
stabilizing the molecules in the birefringent layer.

15. The method of claim 14, further comprising removing all the layers from the substrate.

16. The method of claim 14, wherein the photoalignment material comprises an Azo-Dye material.

17. The method of claim 14, wherein the birefringent material comprises a liquid crystal polymer.

18. The method of claim 14, further comprising curing or polymerizing the birefringent layer by a UV light.

19. The method of claim 14, further comprising stacking a first depolarizer manufactured with one or more second manufactured depolarizer, wherein the first depolarizer's photoalignment layer is different from the one or more second depolarizer's photoalignment layer at least in one of segment, fast axis orientation and pretilt angle.

* * * * *